United States Patent [19]
Beltz et al.

[11] Patent Number: 5,563,922
[45] Date of Patent: Oct. 8, 1996

[54] METHOD AND SYSTEM FOR INDICATING THE POSITION OF CONTROL RODS OF A NUCLEAR REACTOR

[75] Inventors: Eric J. Beltz, Westerville; Robert C. Carruth, Worthington; Stanley K. Farlow, Lewis Center; Eugene L. Fromholtz, deceased, late of Pickering, all of Ohio, by Kathleen M. Fromholtz, executor

[73] Assignee: AEP Energy Services, Inc., Columbus, Ohio

[21] Appl. No.: 553,778

[22] Filed: Oct. 23, 1995

[51] Int. Cl.$^6$ ................................................. G21C 17/00
[52] U.S. Cl. ................................... 376/258; 324/207.17
[58] Field of Search ................................... 376/240, 258, 376/259; 324/207.16, 207.17, 207.18, 207.19, 207.22, 226; 340/686, 870.31, 870.32, 870.33, 870.34, 870.35, 870.36

[56] References Cited

U.S. PATENT DOCUMENTS

| | | | |
|---|---|---|---|
| 3,742,409 | 6/1973 | Santis et al. | 376/258 |
| 4,604,576 | 8/1986 | Barrault | 324/208 |
| 4,623,507 | 11/1986 | Gravelle | 376/258 |
| 4,629,983 | 12/1986 | Boomgaard et al. | 324/208 |
| 4,631,537 | 12/1986 | Neuner et al. | 340/870.17 |
| 4,646,012 | 2/1987 | Feilchenfeld et al. | 324/208 |
| 4,711,757 | 12/1987 | Feilchenfeld et al. | 376/258 |
| 4,714,926 | 12/1987 | Neuner et al. | 340/870.36 |
| 4,719,420 | 1/1988 | Boimond | 376/258 |
| 4,927,594 | 5/1990 | Heibel et al. | 376/258 |
| 4,965,040 | 10/1990 | Huston | 376/236 |
| 5,011,649 | 4/1991 | Ginsberg et al. | 376/215 |
| 5,117,181 | 5/1992 | Clergeot et al. | 324/207.18 |
| 5,229,066 | 7/1993 | Impink Jr. et al. | 376/258 |
| 5,333,160 | 7/1994 | Runde | 376/258 |
| 5,392,321 | 2/1995 | Gaussa Jr. et al. | 376/258 |
| 5,408,508 | 4/1995 | Federico et al. | 376/258 |

Primary Examiner—Daniel D. Wasil
Attorney, Agent, or Firm—Sand & Sebolt

[57] ABSTRACT

A method and system for indicating the position of a nuclear reactor control rod which is suspended from a shaft sliding vertically inside a travel housing. Primary and secondary coils are wound around the travel housing and an AC current travelling through the primary coil induces a secondary voltage across the secondary coil and a primary voltage across a secondary coil of an isolation transformer. The primary and secondary AC voltages are low pass filtered, rectified into DC voltages, and low pass filtered a second time. The secondary DC voltage is divided by the primary DC voltage and a ratiometric signal is produced. The ratiometric signal is compensated by decoupled zero and span adjustments and by a temperature compensation adjustment. A linear correction offset is calculated from data stored in an EPROM and summed with the ratiometric signal yielding a module output signal which is a linear representation of the control rod position.

21 Claims, 7 Drawing Sheets

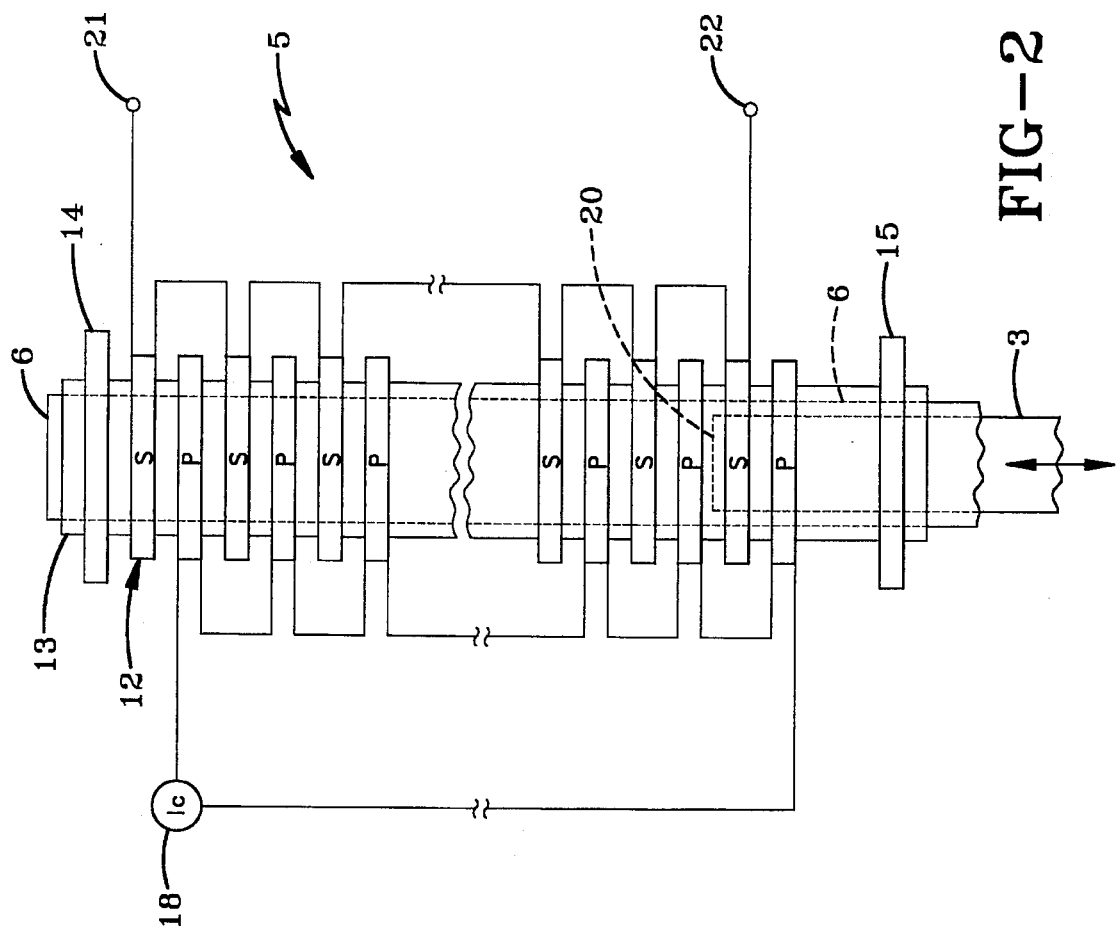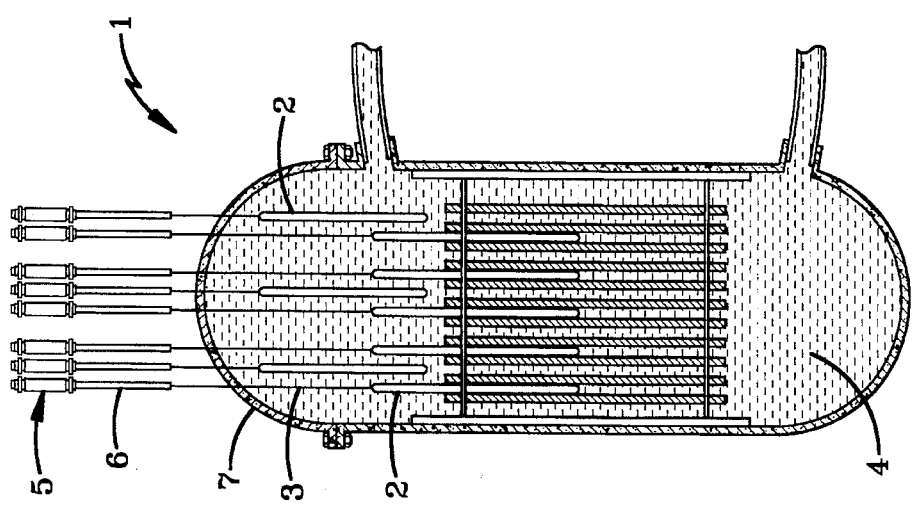

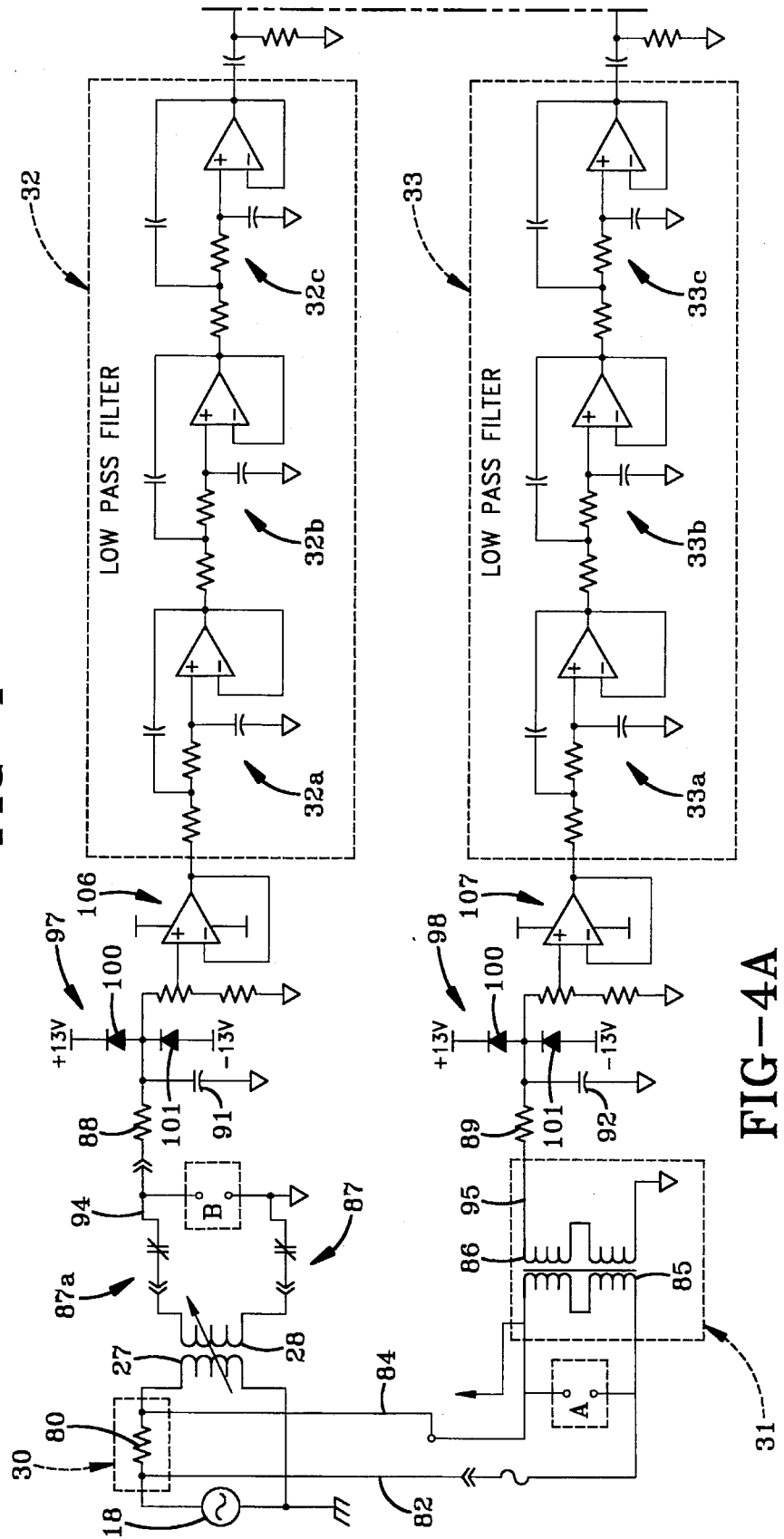

METHOD AND SYSTEM FOR INDICATING THE POSITION OF CONTROL RODS OF A NUCLEAR REACTOR

BACKGROUND OF THE INVENTION

1. Technical Field

The invention relates to a method and system for indicating the position of control rods within a nuclear reactor. More particularly, the invention relates to a rod position indicator method and system which uses both analog and digital circuitry to determine the position of control rods within a nuclear reactor. Even more particularly the invention relates to a rod position indicator method and system which uses a ratiometric technique and simple linear correction circuitry to determine the position of a control rod within the core of a nuclear reactor.

2. Background of the Invention

Control rods, which generally include a cluster of elongated rods containing neutron absorbing materials, regulate the core activity within a nuclear reactor. The movable control rods are located within the region of the nuclear fissionable fuel and penetrate the core and fuel to a selected depth which is measured between 0 and 231 steps. When the control rods are inserted into the reactive region they absorb neutrons emitted from the fuel. The number of neutrons in the fuel determines the number of fissions of the fuel atoms that take place, and the number of fissions determines the amount of energy released by the nuclear reactor. Therefore, the number of control rods inserted and the depth of insertion can along with other measures control the amount of energy released by the nuclear reactor.

Energy in the form of heat is removed from the reactive region by a coolant which flows through the region and to a heat exchanger. The heat from the reactor coolant is used to generate steam for energy. Thus, reactor fuel consideration make it of the utmost importance to accurately know the position of each of the control rods within a nuclear reactor.

The nuclear fissionable fuel elements used in the reactor must be rearranged or replaced about every 1.5 years. After the refueling, all equipment must be tested and calibrated before the reactor can start producing energy. This period of testing and calibration is generally on the critical path to returning the plant to service after a refueling. The critical path includes, among other things, testing and calibrating the electronics which indicate the position of the control rods. As part of the indicator calibrations, the control rods must be fully inserted into the reactive core to calibrate a "zero" step position. The rods are then fully retracted from the reactor core and allowed to thermally stabilize before adjusting a "span" or 231 step position. The reactor may be powered up after these and all other tests and calibrations have been performed. Rod position is then continually monitored using the calibrated rod position indicator.

Rod position has been determined by a number of different types of indicators. One such indicator uses a plurality of layered coils concentrically wound in a stack and supported by a nonmagnetic stainless steel tubular substructure that is slid over a nonmagnetic rod travel housing. The coils are arranged alternately as primary and secondary coils and are connected in series independently from one another. The coils form a long linear voltage transformer distributed over the height of the travel housing such that the coupling from primary to secondary is affected by the extent to which the magnetic drive rod penetrates the coil stack. Rod position is determined by applying a constant sinusoidal excitation current to the primary coil stack and measuring the voltage induced across the secondary coil stack. The magnitude of the induced secondary voltage corresponds to the position of the rod and is processed by an indication system for display on a control panel.

Inherent drawbacks exist in the transformer type rod position indicator system, hereinafter referred to as a RPI system, and other prior art RPI systems. One of these drawbacks is that the reactor vessel contains a plurality of neighboring set of rod position sensing coils, each including primary and secondary coils. The stray magnetic flux by one primary coil induces a voltage on adjacent secondary coils. This induced voltage affects the output secondary voltage and provides an inaccurate reading of the control rod position.

Another drawback of the prior art RPI systems is that the secondary voltage drifts with changes in the operating conditions of the reactor. A principal source of this drift has been traced to changes in the permeability and resistivity of the drive rod with variations in drive rod temperature. This problem causes significant error in the system during reactor operation for rod movements and load changes.

A third drawback of the prior art RPI systems is the time required to calibrate the indicator. Past RPI systems couple the zero and span adjustments. The zero position is calibrated with the rod fully inserted into the reactor. When the rod is retracted to calibrate the span position, the rods have to be allowed to thermally stabilize for at least an hour before an accurate span position can be taken. Since adjusting the span changes the zero, it is necessary to repeat the calibration until the zero and span are within specifications. This process can take several days due to the one hour thermal stabilization period of the rods during the span adjustment and due to the time involved in continually moving the rods into and out of the reactor core.

Another drawback of the prior art RPI systems is the plurality of error sources to which the transformer circuitry is susceptible. These error sources include variations in primary excitation current caused by source variations, variations in the primary excitation current caused by changes in the magnetizing and leakage reactance of the coil stack which results from changes in rod position and core temperature, errors produced by harmonic content of the secondary signal produced by primary current distortion and non-linear aspects of the coil stack magnetics, errors caused by changes in primary circuit loop resistance due to temperature effects and connector contact resistance, and errors caused by changes in secondary loop resistance due to temperature effects and connector resistance variations.

Prior art RPI systems have attempted to solve some of these problems. U.S. Pat. No. 5,392,321 uses a plurality of differential amplifiers which determine both the voltage across the main secondary coil and the induced residual voltage across the adjacent secondary coil. The primary coil which corresponds to the adjacent secondary coil is turned off and a coupled voltage is generated equally on both the main secondary coil and the adjacent secondary coil. The voltage induced on the adjacent secondary coil is measured and subtracted from the voltage across the main secondary coil to produce a compensated voltage across the main secondary coil.

U.S. Pat. No. 4,714,926 uses primary and secondary coils along with a tertiary coil to determine the control rod position. The tertiary coil compensates for voltage drift due to temperature changes and two analog-to-digital converters feed a PROM which stores previously calculated rod position curves.

U.S. Pat. No. 4,631,537 discloses a method for temperature compensating a RPI system. This prior art system uses a direct temperature measurement along with either a plurality of amplifiers, a plurality of analog to digital converters and PROM chips or a combination of both to determine the control rod position.

Still another drawback with the prior art RPI systems is the impact on plant resources when installing upgraded versions of the prior art RPI systems. The design of the prior art RPI upgrade systems requires major rework of the entire RPI system cabinets. This rework translates into additional installation time and cost to accommodate the upgrades.

Calibration problems have historically accounted for three days of the critical path to start-up after routine refueling outages. Two of these three days are tied up in electronics calibration made overly time-consuming by the design of the electronics. Periodically, individual rod position indications go out-of-spec during reactor operation requiring flux maps and supplemental calibration checks to be performed in order to maintain confidence in actual rod position and continue operation. This out-of-spec condition, or the threat of it for rod positions near their technical specification limits, repeatedly have had a negative impact on unit maneuverability and, in the short-term, unit generation. These negative attributes equate to longer plant outages and an overall higher operating cost. These problems have plagued the nuclear power plant industry and defied solution for twenty years. Although the prior art RPI systems were adequate for the purpose for which they were intended, the RPI system of the present invention improves on some of the above mentioned deficiencies.

The RPI system of the present invention decouples the zero and span adjustments. Each adjustment only has to be calibrated once and calibrating one adjustment will not cause the other adjustment to go out-of-spec. This decoupling requires that the thermal stabilization period only be performed once, potentially shortening the period of calibration by two days.

These past RPI systems have provided marginal accuracy when processing the secondary voltage and converting it into a control rod position. The ratiometric technique used in the RPI system of the present invention compensates for variable and unpredictable resistances which occur in the cables which transmits the signals to and from the primary coil and secondary coils, respectively or in the cable connectors which connect the cables to the coils.

The RPI system of the present invention provides back-fit compatibility with existing units and installation requires only minimal modification to the existing card frame chassis wiring. The RPI system of the present invention was designed as a plug-in replacement for the existing devices. When the RPI system is initially installed, an EPROM chip is pre-programmed with data based on past performance and testing to provide for linear correction of the indicator position. Further rod specific corrections may be implemented with the reactor at power or on subsequent reactor outages based on data obtained from each rod during initial calibration checks. The EPROM will not have to be programmed again unless the coil stack or rod drive internals are replaced.

Thus, the need exists for a RPI system which will increase the overall accuracy of the control rod position indication, which utilizes ratiometric techniques to more accurately determine the coupling factor of the coil stack, thereby reducing errors introduced by non-linearities in the rod displacement sensor, and enhance system stability through the use of improved analog and digital signal processing circuits. All of which offers an elegant, cost-effective solution to inaccuracies in current RPI systems that can reduce initial and subsequent calibration time by at least two days, will require no change to coil stacks upon replacement of the existing RPI systems, offers back-fit compatibility with the existing units, and that includes a simple module substitution which can be accomplished with little impact on plant resources. There is no other such method or system of which we are aware which accomplishes these results.

SUMMARY OF THE INVENTION

Objectives of the present invention include providing a RPI system which greatly increases the overall accuracy of the indicated control rod position.

Another objective of the present invention is to provide such a RPI system which uses ratiometric techniques to determine the coupling factor of the coil stack which automatically compensates for unpredictable error sources, such as resistances in the cables or connectors.

A still further objective of the present invention is to provide such a RPI system which decouples the zero and span adjustments and reduces initial and subsequent calibration times by at least two days.

Another objective of the present invention is to provide such a RPI system which enhances system stability through the use of improved analog signal processing circuits and reduces errors introduced by non-linearities in the rod position sensor.

A further objective of the present invention is to provide such a RPI system which offers back-fit compatibility with the existing units and requires only minimal modification to existing card frame chassis wiring.

A still further objective of the present invention is to provide such a RPI system which allows the EPROM chip to be pre-programmed with a typical or rod specific curve to provide for linear correction.

Another objective of the present invention is to provide such a RPI system which allows for one-time programming of the EPROM chip and does not require re-programming unless the position sensor is replaced.

These objectives and advantages are obtained by the method of the present invention, the general nature of which, may be stated as including the steps of applying a primary sinusoidal or AC current to a primary coil of a rod position sensor, said primary AC current induces a secondary AC signal on a secondary coil of said rod position sensor; converting a primary AC signal, which is generated by the primary AC current, and the secondary AC signal to a conditioned primary DC signal and a conditioned secondary DC signal, respectively; dividing the secondary DC signal by the primary DC signal to produce a ratiometric signal; compensating the ratiometric signal for ambient variations on the rod position sensor producing a compensated ratiometric signal; calculating an analog linear correction signal by inputting the compensated ratiometric signal into a linear correction circuit; and summing the compensated ratiometric signal with the analog linearity correction signal to obtain a module output signal which is a linear representation of the control rod position.

BRIEF DESCRIPTION OF THE DRAWINGS

A preferred embodiment of the invention, illustrative of the best mode in which applicants have contemplated applying the principles, is set forth in the following description, is shown in the drawings, and is particularly and distinctly pointed out and set forth in the appended claims.

FIG. 1 is a schematic diagram of a nuclear reactor, including its control rod drive and a rod position sensor in connection with which the method and system of the present invention may be used;

FIG. 2 is a schematic diagram of a rod position sensor of FIG. 1;

FIG. 4 is a block diagram showing the arrangement of the subsequent FIGS. 4A–4D;

FIGS. 4A, 4B, 4C and 4D are circuit diagrams showing the electronic components of the block diagram of FIG. 3;

Item identification numbers refer to similar parts throughout the drawings.

DESCRIPTION OF THE PREFERRED EMBODIMENT

Figure 3:
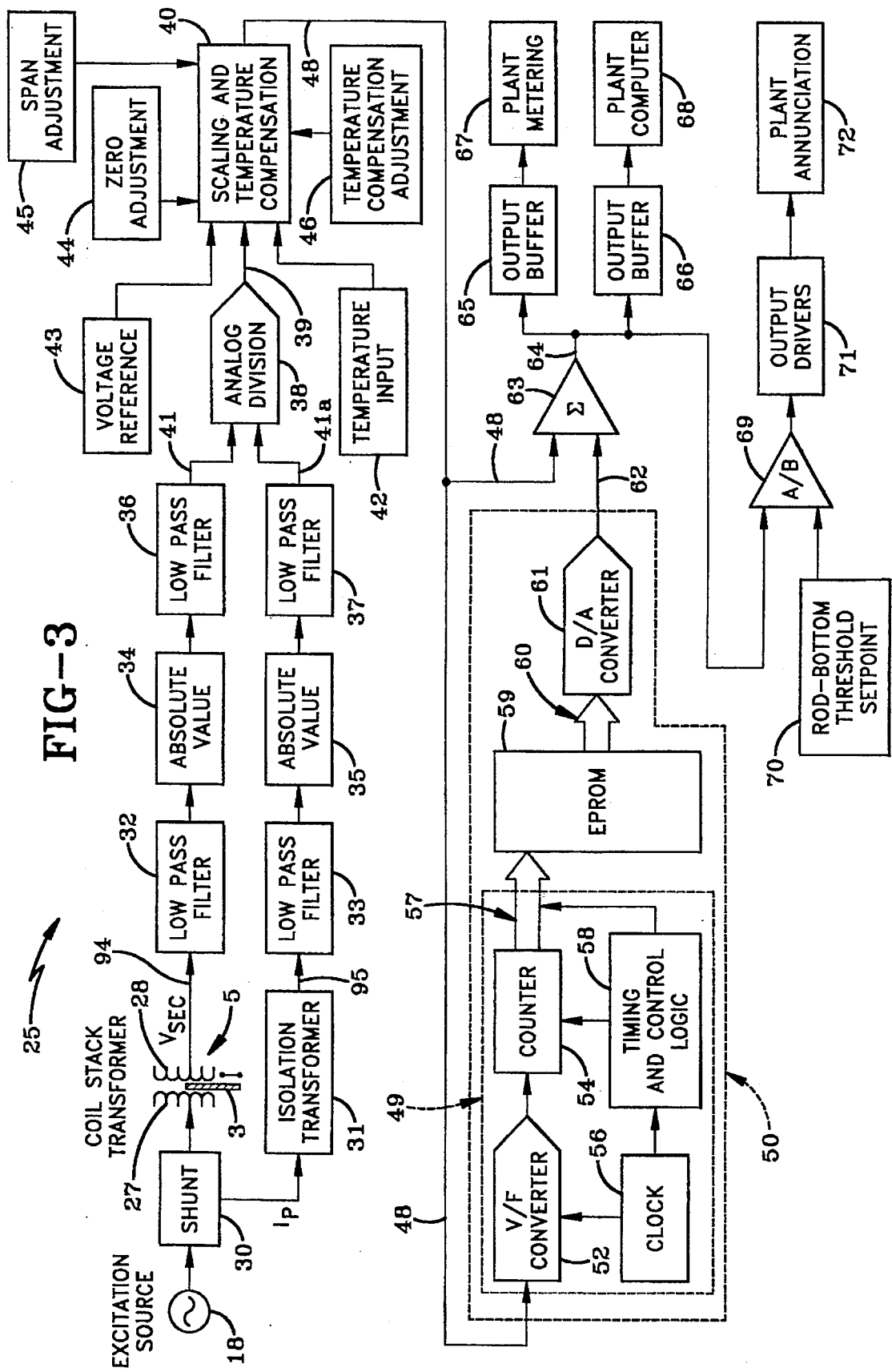
FIG. 3 is a block circuit diagram showing the electronic circuit used with the position sensor of FIG. 2.

Referring to FIG. 1 of the drawings, there is shown therein a nuclear reactor pressure vessel indicated generally as 1. Pressure vessel 1 contains a plurality of control rods 2 structurally coupled to respective drive rods 3. Control rods 2 and drive rods 3 are surrounded with water 4 which completely fills the pressure vessel 1. Under normal operating conditions, the water is at a high temperature and is pressurized so that no boiling takes place.

The position of each control rod 2 is determined from measurements obtained from a sensing mechanism, indicated generally at 5, placed outside the pressure vessel 1. No mechanical penetrations of the pressure vessel 1 for purposes of control rod position sensing are permitted. Thus the area where sensing mechanism 5 can be placed is along a nonmagnetic rod travel housing 6. Drive rods 3, which are made of a metal having magnetic properties, move within their respective rod travel housings 6, which are sealed pipes formed integrally with and extending longitudinally upward from a head 7 of vessel 1.

Sensing mechanism 5 is placed along rod travel housing 6 and can only sense the position of a drive rod 3. However, it is normally assumed that the fastening of control rod 2 to its respective drive rod 3 is reliable and therefore the displacement of drive rod 3 and control rod 2 are the same.

Sensing mechanism 5 is shown in further detail in FIG. 2 and is of the linear voltage transformer type with which the method and system of the present invention are particularly useful. It should be understood that the present method is not restricted in application to the linear voltage transformer indicator but rather may be used with other types of sensing mechanisms.

Sensing mechanism 5 includes a plurality of annular layered-wound primary coils P which are electrically connected in series to form a primary winding, and a plurality of annular, layered-wound secondary coils S which are electrically connected in series to form a secondary winding. The coils are stacked in tandem and are mounted on a coil stack indicated generally at 12. Coil stack 12 includes end plates 14 and 15 and a thin nonmagnetic stainless steel tubular substructure 13 that is slid over travel housing 6 which encloses drive rod 3. Secondary coils S are alternatively interleaved and inductively coupled with primary coils P.

Coil stack 12 is preferably mounted on rod travel housing 6 so that at least the top portion 20 of drive rod 3 penetrates the bottom portion of the core stack. A sinusoidal current source 18 (FIG. 2) is connected for exciting a current in primary winding P which induces a voltage across terminals 21 and 22 of secondary winding S.

In operation, the coupling between the primary and secondary windings increases as drive rod 3 moves through travel housing 6 causing a proportional increase in the magnitude of the voltage induced in secondary winding S. The secondary voltage thus also corresponds to the position of control rod 2 as it is withdrawn from the core of the reactor.

While in theory the relationship between the secondary voltage and the rod position should be linear, in fact there are a number of variables which introduce error into the output of the secondary winding. These errors include changes in the primary and secondary circuit loop resistances due to temperature effects and connector contact resistance, variations in the primary excitation current caused by source variations, variations in the primary excitation current caused by changes in the magnetizing and leakage reactance of the coil stack which result from changes in rod position, primary current distortion and non-linear aspects of the coil stack magnetics which produce harmonic content in the secondary signal, or induced voltages in the secondary circuit from adjacent coil stacks. The system of the present invention includes a method and system for compensating the rod position indication system for such errors.

FIG. 3 illustrates a general block diagram of the rod position indication system of the present invention indicated generally at 25. Sinusoidal current source 18 excites a primary coil stack 27 consisting of primary coils P, with a 60 Hz alternating current (AC). A secondary coil stack 28 consisting of secondary coils S, produces a secondary AC voltage roughly proportional to the excitation current multiplied by the percentage insertion of drive rod 3 into coil stack 12 plus a constant proportional to the excitation current only.

A shunt 30 is connected between source 18 and primary coil 27 and provides current to an isolation transformer 31 whereby a primary AC voltage is induced across a secondary winding of isolation transformer 31 is shown in FIG. 4A. Secondary coil 28 and isolation transformer 31 are connected in series with a pair of low pass filters 32 and 33, respectively (FIG. 3). A pair of absolute value circuits or precision rectifiers 34 and 35 are connected in series and between low pass filters 32 and 33 and a second pair of low pass filters 36 and 37, respectively. Low pass filters 36 and 37 are both connected to an analog divider 38 which outputs a ratiometric signal 39 to a scaling and temperature compensation circuit 40.

Compensation circuit 40 receives a temperature input 42 and a voltage reference 43 along with ratiometric signal 39 and is calibrated using zero adjustment 44, span adjustment 45 and a temperature compensation adjustment 46. Compensation circuit 40 outputs a signal 48 which is fed into a linear correction circuit indicated generally at 50. Linear correction circuit 50 includes a usual analog-to-digital (A/D) converter 49, an EPROM 59 and a digital-to-analog (D/A) converter 61. A/D converter 49 includes a voltage-to-frequency (V/F) converter 52 connected in series with a counter 54, and a clock 56 which drives both V/F converter 52 and a timing and control logic circuit 58.

Counter 54 feeds EPROM 59 with a digital address 57 and EPROM 59 outputs a digital linear correction factor 60 to D/A converter 61 which converts the digital signal to an analog linear correction factor 62. Analog linear correction factor 62 received from D/A converter 61 is summed with signal 48 by a summing block 63. Summing Block 63 outputs a module output value 64 which is a linear representation of the control rod position.

Output 64 is fed into a pair of output buffers 65 and 66 and a magnitude comparator 69 which compares the rod position with a rod bottom set-point 70. Comparator 69 energizes an output driver 71 which drives a plant annunciator 72 to alert plant personnel that a rod bottom condition exists. Output buffers 65 and 66 provide control rod position to a plant meter 67 and a plant computer 68, respectively.

Figure 4B:
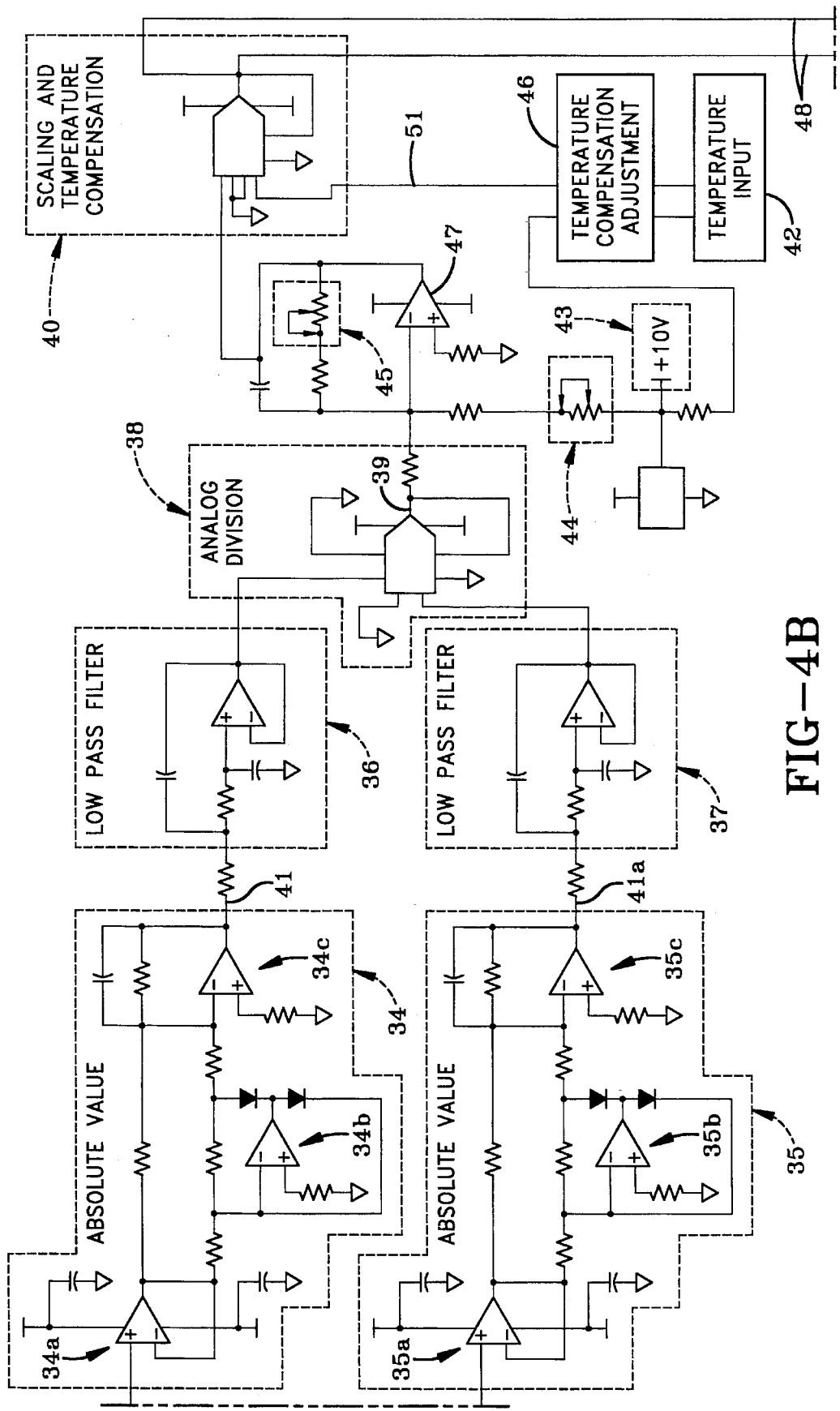

FIGS. 4A–4D show one of the many possible implementations and detailed circuitry of the method and system of the present invention. As shown in FIG. 4A, sinusoidal current source 18 provides an AC current to shunt 30 and primary coil stack 27. Shunt 30 includes a shunt resistor 80 and lines 82 and 84 which are connected to each side of shunt resistor 80. Shunt 30 functions as a current divider allowing current to flow from a first side of shunt resistor 80 through line 82 supplying current to isolation transformer 31 and back into the primary coil stack loop through line 84 on a second side of shunt resistor 80.

Isolation transformer 31 is shown with a primary coil 85 and a secondary coil 86 which outputs an isolated AC signal along line 95. A test point A is connected in parallel with primary coils 85 of isolation transformer 31 to allow testing of the primary signal coming from sinusoidal source 18.

Secondary coil 28 is connected to a pair of normally closed relays 87 and 87a. Relay 87 is connected between one end of secondary coil 28 and ground, and relay 87a is connected to a second end of secondary coil 28 and to a line 94. A test point B is connected between line 94 and ground to allow testing of the secondary signal induced on secondary coil 28. The details of the two low pass filters 32 and 33, precision rectifiers 34 and 35, and low pass filters 36 and 37 are substantially similar except for possible variations in component values.

A resistor 88 is connected in line 94 after test point B and a second resistor 89 is connected along line 95 after secondary coil 86 of isolation transformer 31. A pair of capacitors 91 and 92 are connected between lines 94 and 95 and ground respectively, and along with resistors 88 and 89 provide initial filtering of the respective signals. A pair of usual voltage protectors 97 and 98 are connected to lines 94 and 95 after capacitors 91 and 92 and include forward-biased diodes 100 connected between lines 94 and 95 and positive 13 DC volts, and reversed-biased diodes 101 are connected between lines 94 and 95 and negative 13 DC volts.

A pair of operational amplifier circuits 106 and 107 are connected to lines 94 and 95 respectively, and provide initial isolation to the respective signals with a high input impedance which factors out various resistance errors which may exist in the circuit cables and connectors. The outputs of op amp circuits 106 and 107 are fed into usual high order low pass filters 32 and 33 which are designed by cascading, three second order, low pass filter sections 32a, 32b, 32c and 33a, 33b, 33c, respectively.

The output of low pass filters 32 and 33 are fed into usual precision rectifiers 34 and 35 (FIG. 4B) each of which consists of three op amp circuits 34a, 34b, 34c and 35a, 35b, 35c, respectively, that convert the secondary AC voltage and the primary AC voltage to a secondary DC voltage and a primary DC voltage, respectively, at points 41 and 41a. Precision rectifiers 34 and 35 are connected in series with usual, second order, low pass filters 36 and 37, respectively. Low pass filters 36 and 37 feed analog divider 38 which computes ratiometric signal 39.

Zero adjustment 44 and span adjustment 45 are shown as potentiometers which use the reference voltage 43 to adjust a single op amp 47. Temperature input 42 is fed into temperature compensation adjustment 46 which outputs a temperature adjustment signal 51. The output of op amp 47 and temperature compensation signal 51 are both processed by scaling and temperature compensation circuit 40.

Signal 48 is output from scaling and overall temperature compensation circuit 40 and is input to V/F converter 52 (FIG. 4C) which includes zero and gain adjustment potentiometers 53a and 53, respectively. V/F converter 52 is driven by oscillator/clock 56 which outputs a 4 Hz signal 55 into the timing and control logic 58. Timing and control logic 58 includes nand gates 73, 74, 75 and 76 which are connected to drive counter 54. Oscillator/clock 56 drives V/F converter 52 through line 77 and V/F converter 52 feeds clock input 78 of counter 54. Counter 54 feeds a 12 bit digital address, indicated generally at 57, to EPROM 59 which outputs an 8 bit digital linear correction factor indicated generally at 60. Correction factor 60 is processed by D/A converter chip 79 before being input into op amp 81 of D/A converter 61 and is converted to analog linear correction factor 62 before being summed with ratiometric signal 48 by summing block 63 (FIG. 4D).

Summing block 63 includes a linear scaling potentiometer 83 and op amp circuit 90. Module output value 64 is fed into output buffers 65 and 66 and rod bottom detector 69. Output buffer 65 includes a gain adjust 108 to allow for a variety of meter movements. Output buffers 65 and 66 include voltage protectors 93 and 93a respectively, which are the same as voltage protectors 97 and 98 described above (FIG. 4A). The buffered control rod position is then fed into plant meter 67 and plant computer 68 for further processing.

The rod bottom detector includes a comparator 69 which compares module output value 64 with rod bottom threshold set-point 70 which is set by potentiometer 96. Plant annunciator 72 is represented by a relay coil and is energized if module output value 64 is below the value set by potentiometer 96.

Figure 5:
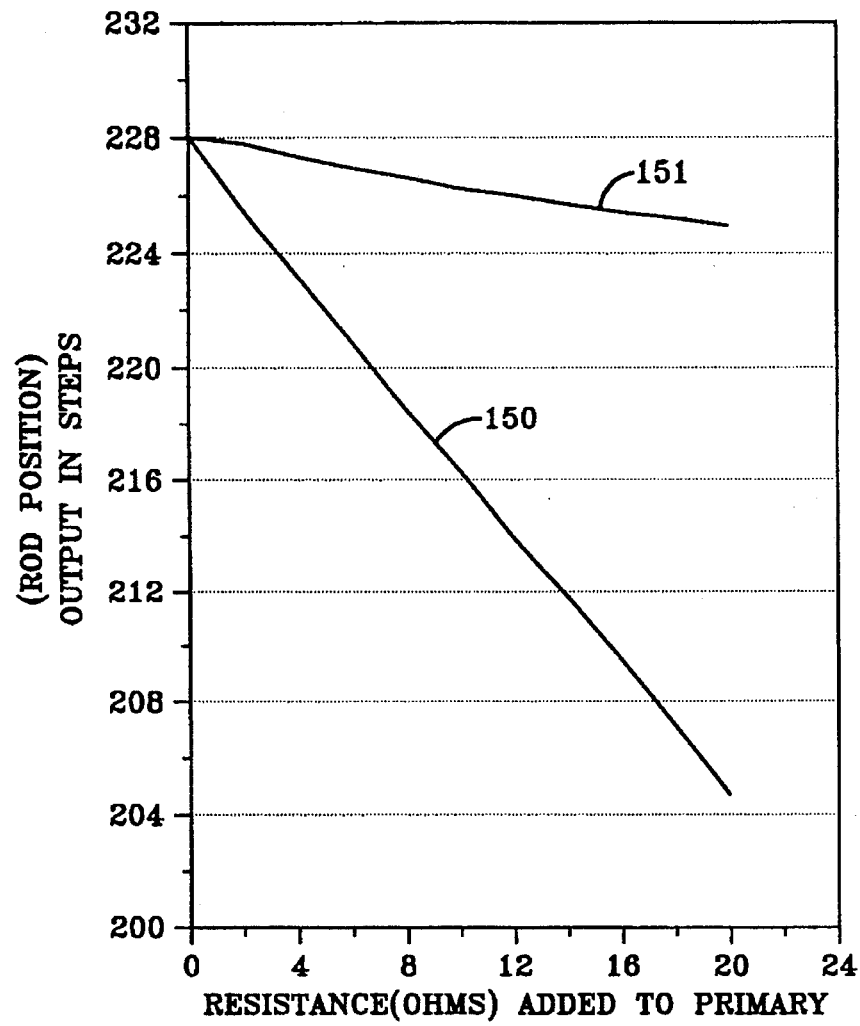
FIG. 5 is a graph illustrating the effect on the output position of a prior art system and the system of the present invention when a resistance is added to the primary coil.
Figure 6:
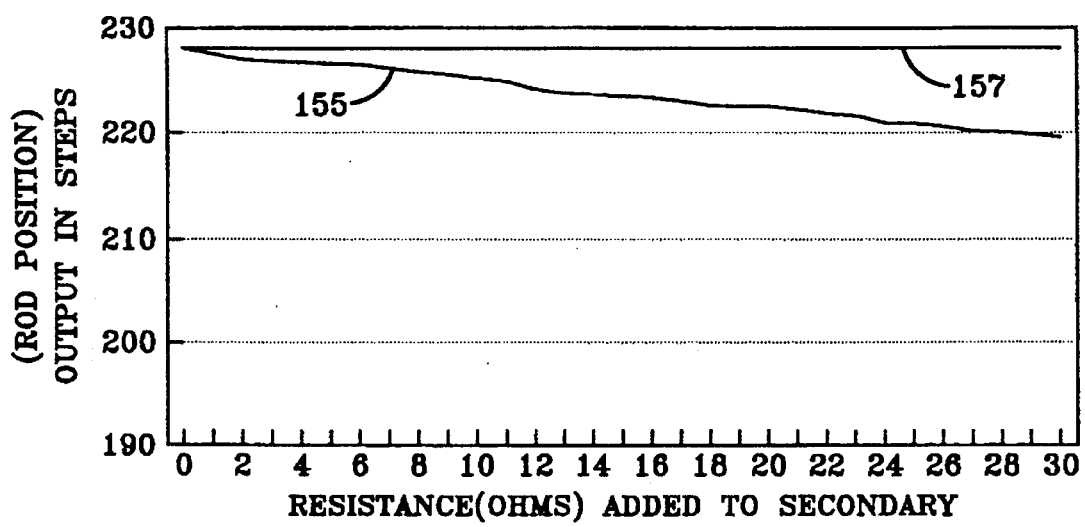
FIG. 6 is a graph illustrating the effect on the output position of a prior art system and the system of the present invention when a resistance is added to the secondary coil.

FIGS. 5 and 6 show the deviations in step position when a resistance is applied to a prior art rod position indication system and the rod position indication system of the present invention. Line 150 of FIG. 5 shows a prior art rod position indicating system of which the present invention is an improvement thereon, when unwanted resistances from 0 to 20 ohms are applied to the primary coil stack circuit as can occur during operation from a variety of uncontrolled sources. As this resistance is added to this prior art circuit or system the measured output of the rod position decreases linearly until a position of approximately 205 steps is indicated when the resistance is 20 ohms. A deviation of approximately 23 steps from an expected 228 steps calculates to an error of approximately 10%.

Line 151 shows the effect on the position indicated output of the system of the present invention with the same resistances applied to the primary coil stack. A 'position of approximately 225 steps is measured by the system of the present invention when the same 20 ohms is applied to its primary circuit. A deviation of approximately 3 steps from an expected 228 calculates to an error of only slightly greater than 1%.

The graph in FIG. 6 shows the output of the two systems when a resistance of up to 30 ohms is added to the secondary coil of the respective circuits discussed above for FIG. 5. Line 155 shows the effect of the added resistance to the secondary of the same prior art system shown by line 150 of FIG. 5, and shows a deviation from the expected 228 step position by slightly more than 8 steps, while line 157 shows the effect of this added resistance to the secondary of the system of the present invention, showing no deviation from the expected control rod position.

In operation, sinusoidal current source 18 applies a 120 volt, 60 Hz sinusoidal or AC current to primary coil stack 27. As magnetic drive rod 3 enters travel housing 6 the magnetic coupling between primary coil stack 27 and secondary coil stack 28 increases while a voltage is induced on secondary coil stack 28.

Shunt 30 provides current to isolation transformer 31 and as the current passes through primary coil 85 a voltage is induced across the secondary coil 86. The voltage induced across secondary coil 86 is proportional in value to the primary current used to induce a voltage across secondary coil stack 28 (FIG. 4A).

The secondary and primary voltages are initially filtered by the RC-circuit formed by resistors 88 and 89 and capacitors 91 and 92, respectively. The signal along lines 94 and 95 is then fed into op amps 106 and 107 respectively, to provide initial isolation of the signals which makes the circuit immune to any substantial secondary circuit resistance changes. Low pass filtering is applied to both signals by filters 32 and 33 which are tuned for a cutoff frequency of approximately 90 Hz to adequately pass the 60 Hz signals and to reject any high harmonic noise. The secondary and primary AC voltages are then converted to a secondary and primary DC voltage by precision rectifiers 34 and 35. The secondary and primary DC voltages are then passed through second low pass filters 36 and 37 to smooth the output of the absolute value circuit and to discriminate against harmonic frequencies generated in the conversion process.

The secondary and primary DC voltages are then fed into analog divider 38 whereby the secondary DC voltage is divided by the primary DC voltage to produce a ratiometric signal 39. In the ideal case, the primary current remains constant while the secondary voltage changes as a function of deliberate changes in rod position. In reality, there is a small interaction introduced as the coupling coefficient of the coil stack core changes with rod position.

The ratiometric signal operates on the principle that if the secondary circuit of a transformer is open circuited, the output voltage will be proportional to the input excitation current and the effective turns ratio of the primary and secondary circuit. Moving the drive rod inside the rod travel housing changes the effective turns ratio of the coil stack. A value proportional to the excitation current is ratioed with the secondary voltage to produce a signal which is proportional only to effective turns ratio of the coil stack. Filtering and rectifying the primary coil current signal and secondary coil voltage signal produces a signal proportional to the original fundamental AC signals without distortion present in the raw AC signals. Forming the ratio of these filtered and rectified signals produces a value for turns ratio which is tolerant to self-generated and applied harmonics.

The design of the present invention is virtually immune to routine fluctuations in AC excitation current regardless of source. Harmonics are removed in the filtering applied to both primary current and secondary voltage by filters 36 and 37. The plant metering circuits see only the magnitudes of fundamental signals applied to and obtained for the coil stack.

The process of producing DC values from the AC primary and secondary signals reduces these signals to scalar values. Induced 60 Hz coupling from adjacent coil stacks add vectorially, with the noise signal substantially quadrature to the signal induced by primary current on the coil stack. For noise signals −3 dB or less, such vectorial addition will produce negligible effect on the scalar equivalent of the resultant vector voltage. The ratiometric approach makes the design immune for all primary circuit resistance changes except those resulting from gross circuit failure. The high impedance input, made possible by the inherent noise immunity of the circuit design allows for substantially secondary circuit resistance changes without adversely impacting the accuracy of the measurement.

The ratiometric signal is fed into scaling and overall temperature compensation circuit 40 (FIG. 4B). External adjustments on the front of the system control panel provides zero, span, and temperature correction gain, as well as mode selection, rod bottom set point, and meter output calibration or gain for the module.

Figure 4C:
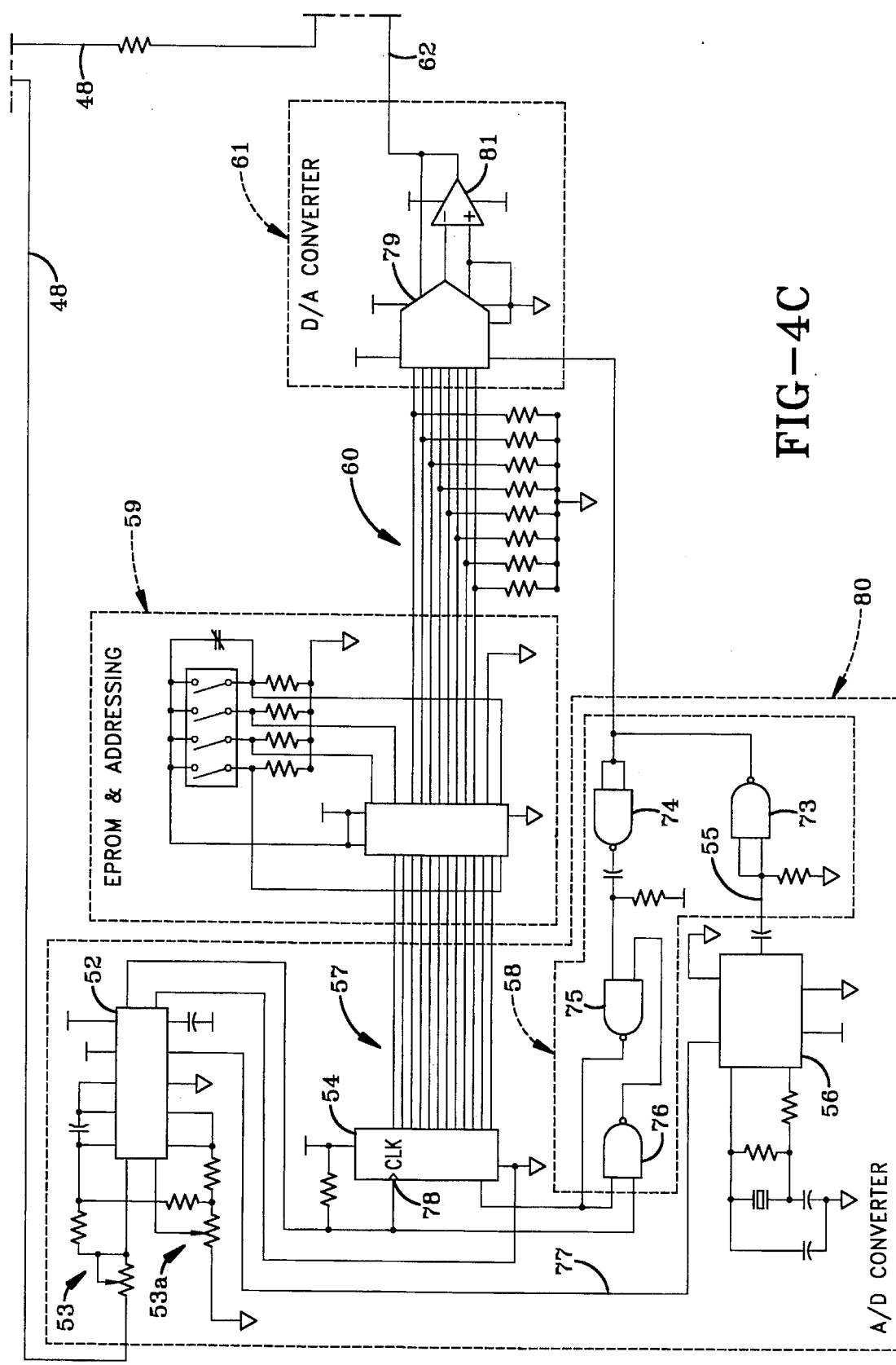
Figure 4D:
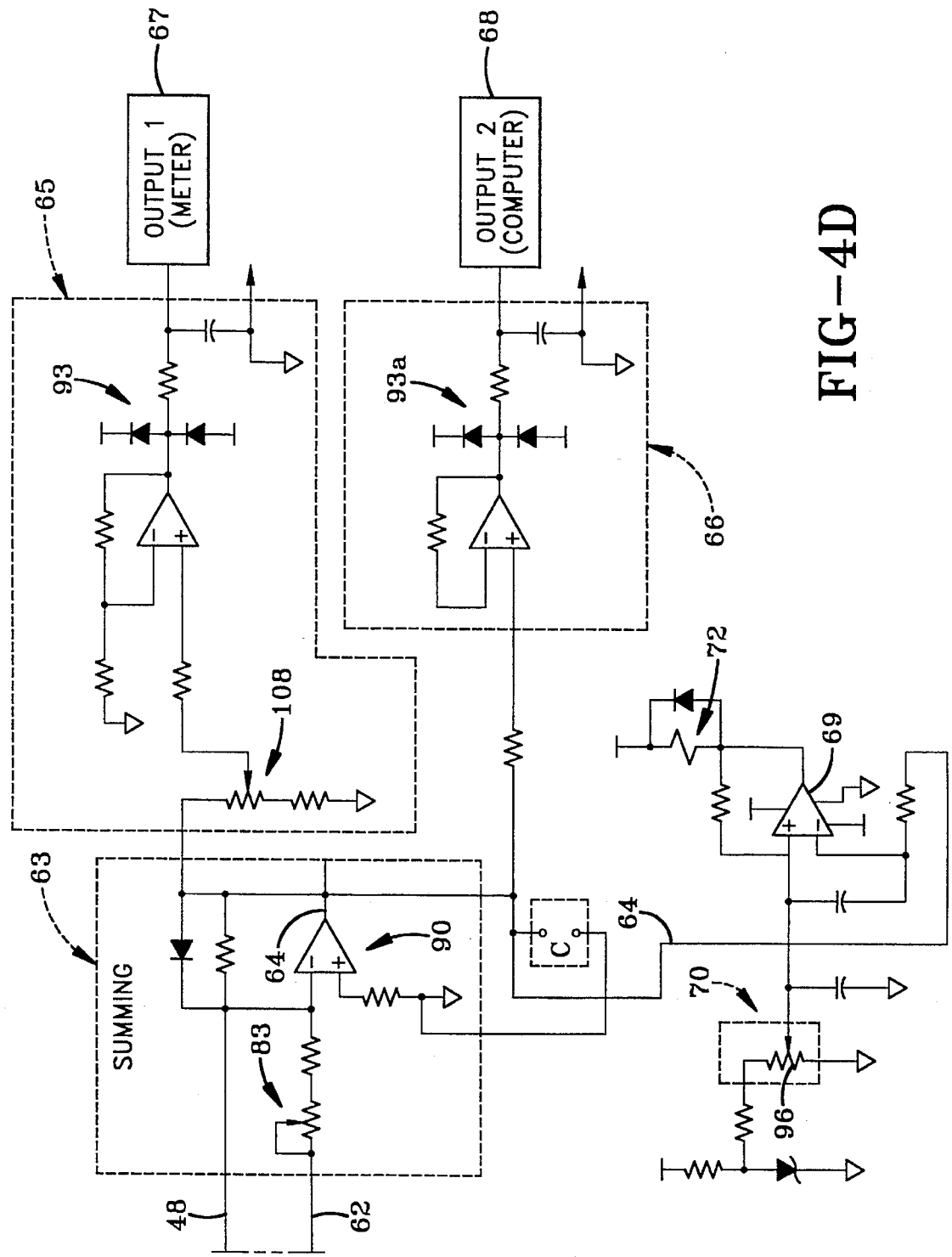

The compensated signal 48 is fed into linear correction circuit 50 (FIG. 4C). EPROM 59 is programmed on-site or off-site with up to eight sets of correction curves with 4096 linearity correction data points that are interpolated from a few sample data values for a given coil stack. Linear correction circuit 50 (FIG. 3) provides for piece-wise linear correction that can easily be customized for each rod position indicator to compensate for inherent non-linearities of individual coil stack magnetics.

In accordance with one of the many features of the system of the present invention zero adjustment 44 and span adjustment 45 (FIG. 4B) have been decoupled allowing for a shorter calibration time during start-up critical path. The control rod is fully inserted into the reactor core and the zero adjustment is calibrated, the control rod is then completely removed from the reactor core and allowed to thermally stabilize for an hour. The span adjustment, being decoupled from the zero adjustment is calibrated without affecting the calibration of the zero adjustment.

Accordingly, the method and system for indicating the position of control rods of a nuclear reactor provides a method and system for desensitizing the coil stack output against excitation source fluctuation by computing the quotient of secondary voltage and primary current. The method and system makes for a more stable rod position indicator and performs a function that is typically handled with a microprocessor-based system. The method and system's elegantly simple design yields high-tech performance without attendant concerns for the application of high-tech upgrades to older operating plants.

The method and system achieves all the enumerated objectives, provides for eliminating difficulties and inaccuracies encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in use, the characteristics of the construction, and the advantageous, new and useful results obtained; the new and useful structures, devices, elements, arrangements, parts and combinations, are set forth in the appended claims.

It is claimed:

1. A method for indicating a control rod position of a nuclear reactor including the steps of:
   a. applying a primary AC current to a primary coil of a rod position sensor, said primary AC current induces a secondary AC signal on a secondary coil of said rod position sensor;
   b. converting a primary AC signal, which is generated by the primary AC current, and the secondary AC signal to a primary DC signal and a secondary DC signal, respectively;
   c. dividing the secondary DC signal by the primary DC signal to produce a ratiometric signal;
   d. compensating the ratiometric signal for ambient variations on the rod position sensor producing a compensated ratiometric signal;
   e. calculating an analog linear correction signal by inputting the compensated ratiometric signal into a linear correction circuit; and
   f. summing the compensated ratiometric signal with the analog linearity correction signal to obtain a module output signal which is a linear representation of the control rod position.

2. The method defined in claim 1 further including the step of galvanically isolating the primary AC current by inducing a primary AC voltage across a transformer, with the value of the primary AC voltage being proportional to the value of the primary AC current.

3. The method defined in claim 1 in which the step of converting the primary and secondary AC signals to primary and secondary DC signals includes filtering the primary AC signal and the secondary AC signal through first low pass filters to eliminate any high harmonic content.

4. The method defined in claim 3 in which the step of converting the primary and secondary AC signals to primary and secondary DC signals includes passing said signals through a rectifying circuit to produce rectified signals.

5. The method defined in claim 4 in which the rectified signals are passed through second low pass filters to smooth the respective signals.

6. The method defined in claim 1 in which the step of compensating the ratiometric signal for ambient variations on the rod position sensor includes separately adjusting zero and span adjustments, said adjustments being decoupled from each other providing for separate calibration of each adjustment.

7. The method defined in claim 1 in which the step of compensating the ratiometric signal for ambient variations on the rod position sensor includes adjusting a temperature compensation adjustment circuit.

8. The method defined in claim 1 further including the step of programming an EPROM with correction data for each control rod.

9. The method defined in claim 1 further including the step of generating a digital address location from the compensated ratiometric signal by passing the signal through an analog-to-digital converter.

10. The method defined in claim 9 further including the step of addressing an EPROM with the digital address location and outputting a digital linearity correction signal.

11. The method defined in claim 10 further including the step of converting the digital linearity correction signal to the analog linear correction signal by passing the digital linearity correction signal through a digital-to-analog converter.

12. The method defined in claim 1 further including the step of detecting a rod bottom position from the module output signal and an adjustable rod bottom threshold set-point.

13. A system for indicating a control rod position of a nuclear reactor including:
   a. a primary AC current source, said source applies an AC current to a primary coil of a rod position sensor which induces a secondary AC signal across a secondary coil of said rod position sensor;
   b. first means for converting a primary AC signal, which is generated by the primary AC current source, and the secondary AC signal to a primary DC signal and a secondary DC signal, respectively;
   c. second means for dividing the secondary DC signal by the primary DC signal to produce a ratiometric signal;
   d. a compensation circuit for compensating the ratiometric signal for ambient variations on the rod position sensor and producing a compensated ratiometric signal;
   e. third means for calculating an analog linearity correction signal from the compensated ratiometric signal; and
   f. fourth means for summing the compensated ratiometric signal with the analog linearity correction signal to obtain a module output signal which is a linear representation of the control rod position.

14. The system as defined in claim 13 in which a transformer galvanically isolates the primary AC signal by inducing a primary AC voltage across a secondary coil of the transformer, the value of the primary AC voltage being proportional to the value of a primary AC current produced by the primary AC current source.

15. The system as defined in claim 13 in which the first means includes a rectifier connected in series with and between two low pass filters.

16. The system as defined in claim 13 in which the compensation circuit includes decoupled adjustments for zero and span positions of the control rod and for temperature compensation.

17. The system as defined in claim 13 in which the third means includes a linear correction circuit which further includes an analog-to-digital converter which addresses an EPROM, said EPROM outputs a digital linearity correction signal which is converted to an analog linearity correction signal by a digital-to-analog converter.

18. The system as defined in claim 17 in which the analog-to-digital converter includes a clock which is connected to a voltage-to-frequency converter and a timing and control logic circuit, said voltage-to-frequency converter and said timing and control logic circuit being connected to a counter which is connected to the EPROM.

19. The system as defined in claim 13 in which the fourth means is a summation circuit which includes an operational amplifier and a plurality of resistors.

20. The system as defined in claim 19 in which a magnitude comparator is connected to an output of the summation circuit, said magnitude comparator compares the module output signal with an adjustable rod bottom threshold set-point and determines if a rod bottom condition exists.

21. The system as defined in claim 13 in which the second means is an analog divider.

\* \* \* \* \*